United States Patent

Coughlan

[15] 3,685,416
[45] Aug. 22, 1972

[54] PHOTOGRAPHIC APPARATUS WITH DYNAMICALLY CONTROLLED REFLEX ACTION

[72] Inventor: Edward H. Coughlan, Canton, Mass.

[73] Assignee: Polaroid Corporation, Cambridge, Mass.

[22] Filed: Dec. 31, 1970

[21] Appl. No.: 103,219

[52] U.S. Cl. ..........................................95/42, 95/13
[51] Int. Cl. .............................................G03b 19/12
[58] Field of Search ....................................95/42, 13

[56] References Cited

UNITED STATES PATENTS

| | | | |
|---|---|---|---|
| 2,997,934 | 8/1961 | Heerklotz | 95/42 |
| 3,126,806 | 3/1964 | Wiessner et al. | 95/42 |

*Primary Examiner*—Samuel S. Matthews
*Assistant Examiner*—E. M. Bero
*Attorney*—Brown and Mikulka, Gerald L. Smith and William D. Roberson

[57] ABSTRACT

Reflex photographic apparatus incorporating an reflecting member which is moved during a photographic cycle to convert an optical path from viewing-focusing to exposure configurations. A low-rate torsion drive spring moves the reflecting member from a viewing position to an exposure position quickly, while minimizing elastic rebound at the termination of movement. A motor is used to return the reflecting member to its viewing position following a photographic exposure. Mounted coaxially with, and disposed within the drive spring, is a second low-rate torsion spring which is operative to provide a lost-motion connection between the reflecting member and the return motor. Should the reflecting member be restrained during its return movement, the lost-motion connection permits the motor to complete its cycle without overloading.

11 Claims, 5 Drawing Figures

INVENTOR.
EDWARD H. COUGHLAN

BY Brown and Mikulka

ATTORNEYS

PATENTED AUG 22 1972 3,685,416
SHEET 2 OF 3
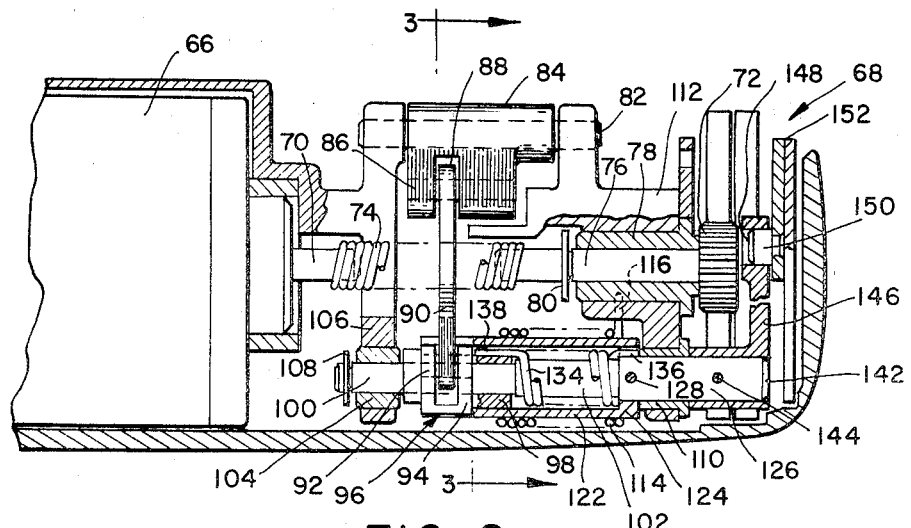
FIG. 2
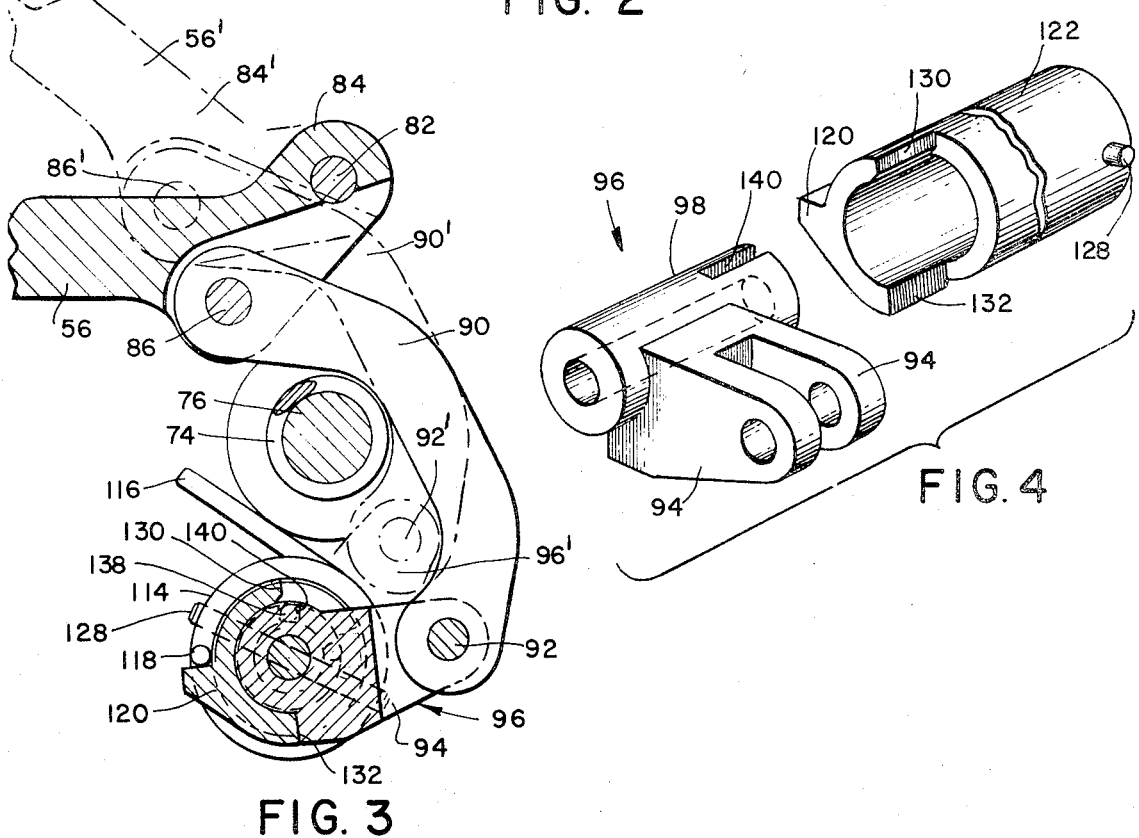
FIG. 3
FIG. 4
INVENTOR.
EDWARD H. COUGHLAN
BY *Brown and Mikulka*
ATTORNEYS

PHOTOGRAPHIC APPARATUS WITH DYNAMICALLY CONTROLLED REFLEX ACTION

BACKGROUND OF THE INVENTION

The operation of single-lens reflex cameras generally includes the steps of viewing and focusing the image of a subject through the camera's objective lens and actuating a shutter release button. This actuation closes the camera shutter, moves the camera's reflecting member to an exposure position which allows exposure of a film unit, operates the shutter to make the exposure, and returns the reflecting member to its initial pre-exposure or viewing position in preparation for a next exposure cycle. Movement of the reflecting member between its viewing and exposure positions generally is carried out by drive spring arrangements. Inasmuch as it is desirable to complete a photographic cycle in a minimum amount of time, particularly with hand-held reflex cameras, reflex conversion by the camera's reflecting member should be carried out in a minimum amount of time. The minimization of the time required for this activity can be achieved by driving the reflecting member with relatively powerful springs. Although such springs move the reflecting member to its exposure position in a minimum amount of time, they introduce problems of halting it at its terminal operating position. For instance, in the absence of complex damping, the reflecting member may bounce when it reaches its exposure position. Such dynamic instability at the exposure position often produces unacceptable camera vibrations. The elimination of such vibration becomes most important, however, when the reflecting member forms part of a taking optical path. With such reflex systems, and undue dynamic instability of the reflecting member at its exposure position produces focusing error.

Fully automated cameras usually incorporate an electronic motor as a power source for carrying out film processing operations following the exposure of a film unit. Where the automated cameras utilize a reflex viewing system, their reflex mode converting reflecting members preferably are cocked following an exposure using power derived from the motor. As a consequence, the reflecting member drive system will usually require an overtravel form of drive linkage to assure proper seating at its cocked position. These overtravel features are difficult to incorporate within the confined housings of compact cameras without resorting to the use of relatively high-torque rate springs. The loads imposed therefrom upon a small drive motor are difficult to accommodate.

If the reflecting member encounters any interference during its movement toward its cocked or preexposure position, the motor may be overloaded and damaged. If the motor is overloaded enough, the power drain upon a power supply, such as a battery, may render it incapable of carrying out other powered functions during a given photographic cycle.

SUMMARY OF THE INVENTION

The present invention is addressed to cameras of the single-lens reflex type and, more specifically, to a drive system including a lost-motion connection for moving an reflecting member between a viewing position and an exposure or erected position. Movement of the reflecting member between these positions is accomplished through a system incorporating a four-bar linkage and a drive spring. The system is configured to minimize the time required for moving the reflecting member to its exposure position. Additionally, the system is configured to minimize the elastic rebound of the reflecting member which is generated as a result of driving the member to its exposure position at a relatively fast rate.

In a preferred embodiment of the invention, a low-rate torsional drive spring is employed for moving the reflecting member to its erected position. Such springs are characterized in providing a low-torque dissipation through their excursion angle. When properly prewound, the low-rate drive spring not only minimizes the reflecting member movement time but also reduces its elastic rebound amplitude when suddenly halted at an exposure position. This is achieved by maximizing the residual torque of the drive spring at the erected position of the reflecting member. As another feature, an erecting linkage is positioned between the reflecting member and the drive spring to minimize any warping of the reflecting member due to a direct coupling thereof with a drive spring.

A prewound overtravel torsion spring is provided within the drive system and is configured to serve a dual purpose. The overtravel spring functions to ensure that the reflecting member is fully seated in its viewing position by allowing a motor to remain energized for a select interval following the seating of the member. The overtravel spring absorbs the resultant overtravel motion and biases the member into its viewing position. This permits more easily met manufacturing tolerances in the reflecting member-return mechanism since the components thereof do not have to cooperate to move the reflecting member the precise distance between its exposure position and viewing position. Additionally, the overtravel spring serves to provide an override or lost-motion connection between the motor and the reflecting member. If the reflecting member encounters any interference during its motor driven movement between exposure and viewing positions, the overtravel spring will allow the motor to finish its normal return cycle. The energy from the motor will be transferred to, and stored in, the overtravel spring until such time as the interference is removed. At such time, the overtravel spring returns the reflecting member to its viewing position. In this manner, any overload or damage to the motor will be alleviated.

Another object and feature of the invention is to provide a reflex photographic apparatus having an reflecting member movable between a viewing position and an exposure position, an erecting linkage for moving the member between its positions, a motor for supplying power to move the reflecting member from its exposure position to its viewing position, a drive spring for actuating the erecting linkage, and an overtravel spring coupled between the linkage and the motor for actuating the linkage to drive the reflecting member to one of its positions and for providing a lost-motion connection with the motor when the reflecting member is restrained.

Another object and feature of the present invention is to provide a photographic apparatus of the reflex type including a low-rate drive spring for moving an reflecting member from its viewing position to its exposure position in a minimum amount of time, but which will reduce the elastic rebound of the reflecting member when it is suddenly halted at its exposure position.

Another object and feature of the present invention is to provide a reflex photographic apparatus including an reflecting member movable between viewing and exposure positions, a low-rate drive spring for moving the reflecting member from its viewing to its exposure position, motorized drive means for moving the reflecting member from its exposure to its viewing position, and a low-rate overtravel spring for enabling the motorized drive means to overtravel beyond a point necessary to move the reflecting member into its viewing position, thereby seating the reflecting member without having to depend upon close manufacturing tolerances within the motorized drive means.

Other objects and features of the invention will in part be obvious and will in part appear hereinafter.

The invention accordingly comprises the apparatus possessing features, techniques, and properties which are exemplified in the description to follow hereinafter.

For a fuller understanding of the nature and objects of the invention, reference should be made to the following detailed description taken in connection with the accompanying drawings.

BRIEF DESCRIPTION OF THE DRAWINGS

FIG. 2 is an enlarged fragmentary view of the rear of the camera with portions broken away to reveal internal structure;

FIG. 3 is a sectional view of the apparatus taken through the plane of line 3—3 in FIG. 2;

FIG. 4 is an enlarged perspective view of a portion of the apparatus as shown in FIG. 1.

DETAILED DESCRIPTION OF THE DRAWINGS

Figure 1:
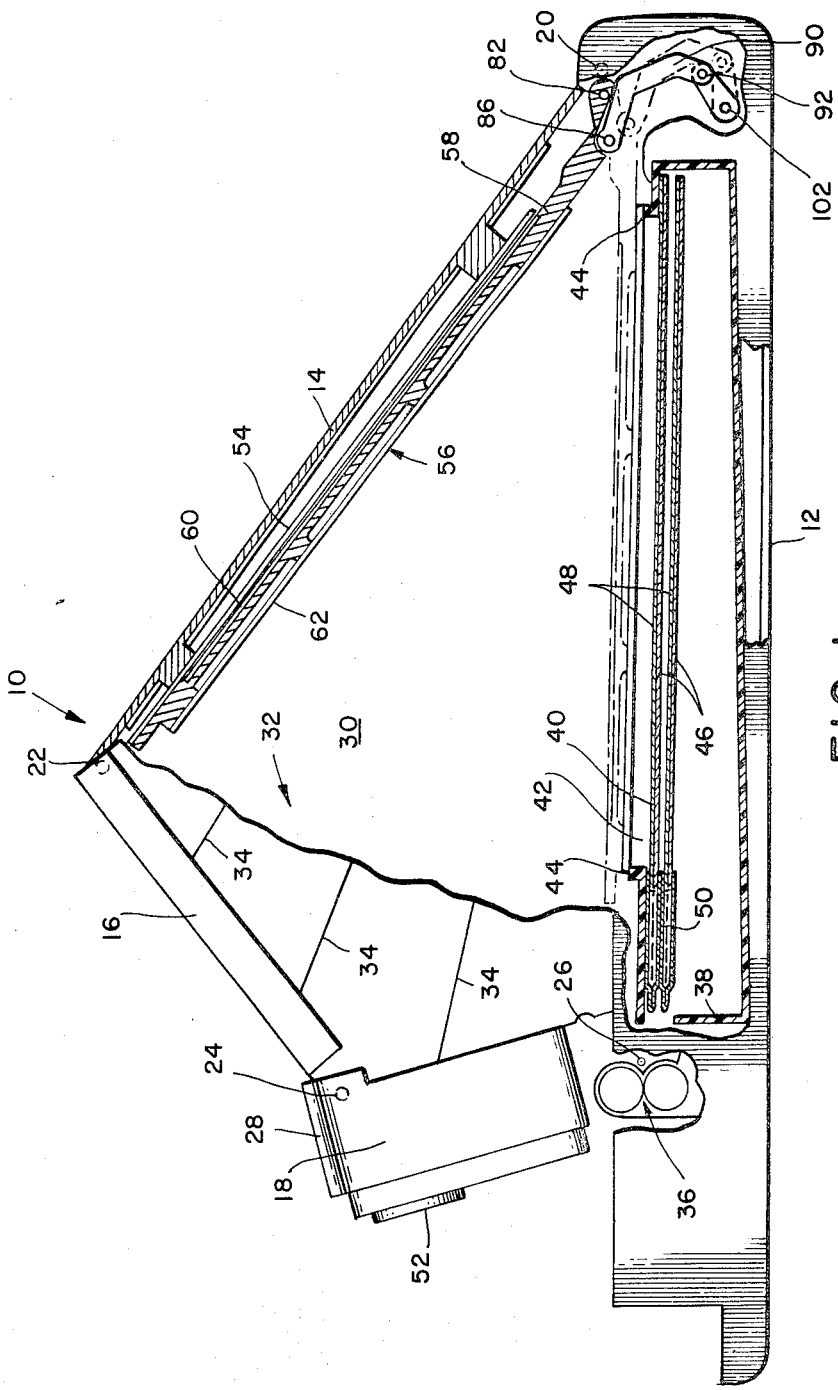
FIG. 1 is an elevated view, partly in section, of a collapsible type, single-lens reflex camera, the camera being shown in its extended or operative position.

Referring to FIG. 1 of the drawings, there is shown a camera 10 of the extensible type, the camera being shown in its extended or operative position. Camera 10 includes a plurality of housing sections 12, 14, 16 and 18 suitably pivoted to each other about axes 20, 22, 24 and 26 for movement between the extended position shown and a compact folded position wherein housing sections 14 and 16 cooperate to define the top wall (as viewed in FIG. 1) of the camera and surface 28 of housing section 18 cooperates with an end portion of housing section 12 to define an end wall of the camera. Housing sections 12, 14, 16 and 18 cooperate with each other, in the extended position, to define four sides of a six-sided exposure chamber 30, the remaining two sides of the chamber 30 being closed by a flexible bellows 32 formed of any suitable opaque plastic material. Bellows 32 includes a plurality of creases 34 which constitute a memory system for ensuring that the bellows 32 collapses in a predetermined manner when the camera is folded.

Housing section 12 includes means (not shown) for mounting a pair of motor driven processing rolls 36 and a film container 38 such that the forwardmost film unit 40 located within the container 38 is located in position for exposure by light transmitted through an exposure aperture 42 located in wall 44 of the container 38.

For a more detailed description of such a camera 10, reference should be made to a photographic apparatus described and claimed in a copending application for U.S. Pat. by Edwin H. Land entitled "Reflex Camera," filed Apr. 4, 1970, Ser. No. 28,567, and assigned in common herewith.

Film units 40 (only two of which are shown) are similar to those shown in U.S. Pat. No. 3,415,644 and generally include a photosensitive element 46, a superposed transparent image-receiving element 48 and a pod 50 containing a processing liquid attached near one end of the two elements. After exposure, the forwardmost film unit is advanced by any suitable means from the container into the bite of motor driven processing rolls 36 wherein the pod 50 is ruptured and the liquid contained therein is evenly distributed between the photosensitive and image-receiving elements to initiate a diffusion transfer process as is more fully described in the aforementioned patent.

The camera's optical system generally includes a lens and shutter assembly 52, a generally planar reflecting surface, e.g., a mirror 54 mounted on an interior wall of housing section 14, an reflecting member 56 and a rangefinder and/or viewfinder (not shown). Reflecting member 56 includes a mirror mount 58 which carries a Fresnel-type mirror 60 on one side thereof and a generally planar mirror 62 on the opposite side thereof. As can be seen in FIG. 1, member 56 is pivotally mounted to the camera about pin 82 for movement between an exposure position shown in solid lines and a viewing position as shown in broken lines in FIG. 1.

During operation of camera 10, the reflecting member 56 is initially in the broken line position shown in FIG. 1. The image of the subject to be photographed is transmitted by the camera's objective lens 52 into the interior of exposure chamber 30 wherein it is reflected by mirror 54 onto Fresnel-type mirror 60 and thence to the camera's viewfinder. After the image has been properly focused, the camera's shutter actuating button is depressed to close the shutter and the viewfinder aperture and stop the entry of all actinic light into chamber 30. Next, the reflecting member 56 is driven from the viewing position to the exposure position shown in solid lines in FIG. 1 by a drive spring. When member 56 reaches its exposure position, the shutter is operated to make the exposure, and the image is directed toward the film unit 40 by mirror 62.

Referring additionally to FIGS. 2 and 3, the motorized drive components positioned along the rearward edge of housing section 12 are revealed in detail along with the spring-driven mounting of reflecting member 56. An electric motor 66 is attached to the rear portion of housing 12 and is operative to supply power to a force-transmitting assembly of suitable construction shown generally at 68 as well as to processing rolls 36. An output shaft 70 of motor 66 is connected to an input gear 72 of assembly 68 through a spring-type slip clutch 74. Spring 74 is frictionally attached between output shaft 70 and a drive shaft 76, connected to gear 72. Shaft 76 is fixed to gear 72 and is rotatably supported within a bushing 78 formed as a portion of housing section 12 of camera 10. A washer 80 is connected to shaft 76 for retaining it within bushing 78. Spring 74 is configured to release from its frictional engagement between shafts 70 and 76 should the load imposed upon motor 66 exceed a predetermined limit.

Reflecting member 56 is driven between its operational positions by a four-bar linkage assembly. The components of this four-bar linkage include the pivotal coupling at shaft 82 of a hinge extension 84 of operator assembly 56. Hinge extension 84 is configured to retain another shaft 86 spaced forwardly from shaft 82. Hinge extension 84 is additionally configured having an access slot 88 within which pivotal connection between shaft 86 and a draw-down link 90 is effected. Draw-down link 90 is pivotally connected through a shaft 92 to the tip of dual arm portions 94 of a bell crank shown generally at 96. Forming the final component of the four-bar linkage, the hub portion 98 of bell crank 96 is rotationally mounted upon the necked-down or stepped-down portion 100 of a cylindrical shaft 102. Portion 100 of shaft 102 is rotatably supported within a bushing 104 which is fixed to an extension 106 of housing section 12. A washer assembly 108 is connected to the end of portion 100 and serves to limit the longitudinal movement of shaft 102. The opposite end of shaft 102 is rotatably supported within a bushing 110 formed within portion 112 of housing section 12.

Reflecting member 56 is retained in its viewing mode orientation by virtue of the outward orientation of the dual arms 94 of bell crank 96. Reflecting member 56 is driven to its exposure mode orientation, shown partially in phantom at 56', by a driving force exerted from bell crank 96 through draw-down link 90. The exposure mode orientations of bell crank 96 and draw-down link 90 are shown in phantom at 96' and 90', respectively. Reflecting member 56 is driven into its exposure position as well as returned to its viewing position by forces exerted from bell crank 96 through draw-down link 90.

A low-rate multi-turn torsion spring 114 is used for powering bell crank 96 to drive reflecting member 56 into its exposure position. One end 116 of spring 114 is fixed or grounded to frame portion 112, while its opposite end 118 is configured to abut against the tang portion 120 of a cylindrically-shaped sleeve 122.

Referring additionally to FIG. 4, sleeve 122 generally is configured as a hollow right cylinder having a thickened end portion 124 (FIG. 2), the internal surface of which is bored to fit over a stepped-up portion 126 of shaft 102. Sleeve 122 is fixed to and co-rotatable with shaft 102 as a result of its connection thereto by a pin 128. Beyond thickened portion 126, sleeve 122 slidably couples over hub 98 of bell crank 96. This same end portion of sleeve 122 is cut away to provide top and bottom abutting key surfaces at 130 and 132. In operation, surfaces 130 and 132 of sleeve 122 selectively abut against dual arm portion 94 of bell crank 96. When spring 114 is loaded or wound, its movable end 118 abuts against tang 120 of sleeve 122, urging it to rotate in a counterclockwise direction as viewed in FIG. 3. Surface 132 of sleeve 122 abuts against arm portion 94 of bell crank 96, biasing the latter to move correspondingly. As a result, when shaft 102 is free to rotate, spring 114 will rotate sleeve 122 in a counterclockwise direction (FIG. 3). Due to the abutting engagement between arm portions 94 and bottom key surface 132, sleeve 122 will drive bell crank 96 to its position as shown at 96'. This rotation of bell crank 96 causes draw-down linkage 90 to move to its position at 90' as shown in FIG. 3. The upward movement of draw-down link 90 rotates hinge extension 84 in a clockwise direction about shaft 82 causing reflecting member 56 to move to its erected exposure position.

Mounted coaxially with spring 114 over the central portion of shaft 102 is an overtravel torsion spring 134. Spring 134 is located within the interior of sleeve 122. One end 136 of spring 134 is connected within the thickened portion 124 of sleeve 122. The opposite end 138 of spring 134 is connected to bell crank 96 by insertion within a slot 140 formed in hub 98. Spring 134 is selectively prewound and has a strength sufficient to urge bell crank 96 toward key surface 132 of sleeve 122.

Following an exposure interval, motor 66 is energized to power rolls 36 and cock reflecting member 56. The latter operation is carried out by rotatably driving shaft 102 through its connection with a drive bell crank 142 mounted at the outward end of shaft 102. Bell crank 142 is fixed to stepped-up portion 126 of shaft 102 by a pin 144 extending therethrough and includes an upwardly extending arm portion 146. The tip portion of arm 146 is configured having a hole 148 to provide a pivotal connection with a pin 150 integrally formed with a reduction assembly output link 152.

With the arrangement thus described, when shaft 102 is rotated during a cocking operation, rotational force will be transmitted through both overtravel spring 134 and sleeve 122 into bell crank 96. Rotation of sleeve 122 from shaft 102 also winds spring 114 from tang 120. As the united sleeve 122 and bell crank 96 are rotated, reflecting member 56 is repositioned by the four-bar linkage into its viewing position adjacent the exposure plane as shown in phantom in FIG. 1.

Overtravel spring 134 provides a lost-motion or override function permitting motor 66 to operate for a select interval of time following the seating of reflecting member 56 into its viewing mode position. This allows for greater latitude in manufacturing tolerances of the drive system since the various components of the system do not have to cooperate to move reflecting member 56 a precise distance; i.e., the exact distance between the exposure and viewing positions. Additionally, spring 134 provides a lost-motion connection between motor 66 and reflecting member 56 should the reflecting member 56 be jammed or interfered with during conversion from its exposure to its viewing mode. In the latter regard, it may be noted that the cutaway portion of sleeve 122 does not fully capture the extensions 94 of bell crank 96. As seen in FIG. 3, a spacing allowing about 45° of relative rotation is provided between surface 130 of sleeve 122 and arm portion 94 of bell crank 96.

OPERATION

A photographic cycle is commenced by depression of a shutter release button (not shown) mounted upon camera 10. Output link 152 is released for free travel at and movement by a central mechanism (not shown). As a result, bell crank 142 and shaft 102 become freely rotatable and drive spring 114 rotates sleeve 122 in a counterclockwise direction (FIG. 3). Since arm portions 94 of bell crank 96 are in abutting engagement with bottom key surface 132, the sleeve 122 drives bell crank 96 to its position at 96'. This rotation of bell crank 96 causes draw-down link 90 to move upward to its position at 90'. The upward movement of draw-down link 90 rotates hinge extension 84 in a clockwise direction about shaft 82 causing reflecting member 56 to move to its erected exposure position as shown at 56'.

It is operationally desirable to configure drive spring 114 in such a manner as to move reflecting member 56 to its exposure position in a minimum amount of time. This may be accomplished by making spring 114 larger. However, with the introduction of a larger drive spring, there is encountered a problem of elastic rebound when reflecting member 56 reaches its exposure position. This undesirable rebound is a result of driving reflecting member 56 upward and then immediately halting it. Since planar mirror 62 is formed as a part of reflecting member 56 and is positioned within the taking optical path, any dynamic instability of the member may cause focusing error. To minimize this error, drive spring 114 is configured as a low-rate torsion spring. Low-rate springs are characterized in providing a low-torque dissipation through a given excursion angle. Accordingly, low-rate drive spring 114 is operative to move reflecting member 56 from its viewing to its exposure position while retaining a select amount of residual torque at the exposure position. This residual torque serves not only to retain the member 56 in position but also to damp or overcome any tendency it may have to "bounce."

After an exposure is completed, electrical switches within camera 10 are closed to energize motor 66. Motor 66 commences to rotate shaft 70. This rotation is translated through force-transmitting assembly 68 to output link 152 and thence through arm 146 to shaft 102. Shaft 102 is caused to rotate in a clockwise direction, as seen in FIG. 3, and, due to the connection between shaft 102 and sleeve 122, the latter is moved correspondingly. Overtravel spring 134 transmits rotational movement from sleeve 122 to bell crank 96. Bell crank 96 and draw-down link 90 are moved from positions at 96' and 90' to positions at 96 and 90, respectively, as shown in FIG. 3. As a result, reflecting member 56 is moved from its exposure to its viewing position.

Overtravel spring 134 is operative to properly seat reflecting member 56 in its viewing position. During this operation, motor 66 operates for a select interval of time following the movement of reflecting member 56 into its viewing position. At that time, bell crank 96 ceases to rotate and overtravel spring 134 is operative to absorb the overtravel rotation of sleeve 122. During such overtravel, bottom key surface 132 is moved out of its abutting engagement with arm portions 94 of bell crank 96. The rotation of sleeve 122 and tang 120 causes drive spring 114 to be wound in preparation for a next succeeding photographic cycle. This overtravel tensioning, in addition to the prewinding of spring 134, provides a latching bias to bell crank 96, retaining reflecting member 56 in its viewing position. As a result, the need for close manufacturing tolerances within the motor drive linkage for moving reflecting member 56 from its exposure to its viewing position is alleviated.

Overtravel spring 134 is operative as a lost-motion connection between motor 66 and reflecting member 56. If reflecting member 56 encounters any significant interference during movement between its exposure and viewing positions, e.g., some object is inadvertently positioned in its path of travel, the lost-motion connection of overtravel spring 134 operates to prevent damage to the erecting components of the camera. Spring 134 will allow motor 66 to continue to rotate sleeve 122 until motor 66 has reached the end of its cocking cycle without transmitting this rotational force to reflecting member 56.

The lost-motion connection provided by spring 134 functions as follows. At the commencement of a cocking operation, reflecting member 56 is in its exposure position. Motor 66 is turned on and commences to cause the rotation of shaft 76. This rotation is transmitted through the force-transmitting assembly 68 to arm 146. Arm 146 is rotated toward the rear of camera 10, moving shaft 102 and sleeve 122 correspondingly. If during the movement of arm 146 the reflecting member 56 is stopped in its downward movement, hinge extension 84 and bell crank 96 will also stop. However, arm 146 continues to rotate sleeve 122 from shaft 102. As sleeve 122 continues to rotate, the abutting engagement between arm portions 94 of bell crank 96 and bottom key surface 132 is broken. Sleeve 122 will continue to rotate until top key surface 130 approaches a position of abutment with arm portions 94. In the embodiment illustrated, a 45° override rotation is allowed. This rotation is sufficient to permit motor 66 to finish its cocking cycle and turn off. When the source of interference has been removed, spring 134 releases the energy previously stored therein and drives bell crank 96 in a clockwise direction until reflecting member 56 is seated in its viewing position.

Preferably, overtravel spring 134 is preloaded to provide a residual downward bias to bell crank 96 for properly retaining reflecting member 56 at its viewing position. Additionally, spring 134 is configured having as low a rate as possible due to its driven relationship with motor 66 during override operation. Motor 66 must provide power to tension spring 134 a sufficient amount so that when motor 66 completes its cycle, spring 134 will drive bell crank 56 downward into its viewing position. In addition to winding overtravel spring 134 during an override operation, motor 66 must also provide power to wind drive spring 114 to its prewound condition. Accordingly, the energy which motor 66 must expend during override operation should not substantially exceed that amount expended during normal operation or the motor will be overloaded.

Figure 5:
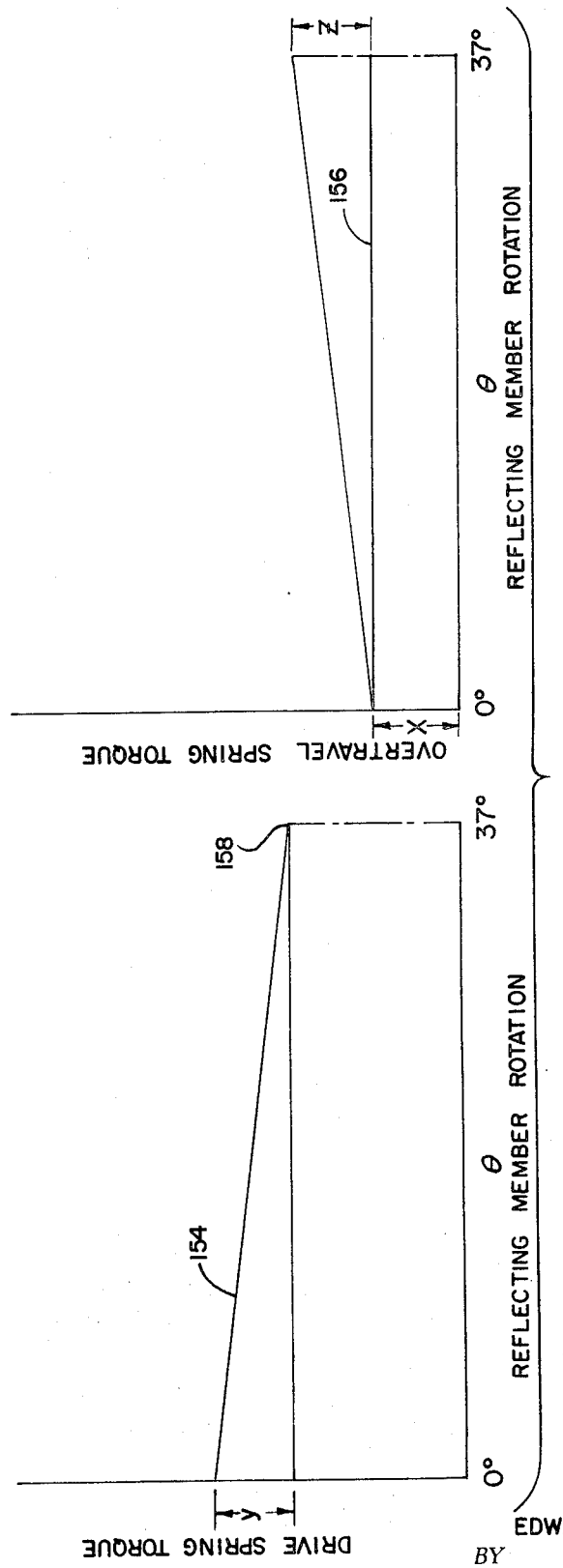
FIG. 5 is a graph of the spring rates of two springs incorporated in the apparatus.

FIG. 5 shows the spring rates of drive spring 114 and overtravel spring 134. Both drive spring 114 and overtravel spring 134 are prewound a select amount. In the present embodiment, reflecting member 56 traverses an angle of about 37° during its movement from its viewing position (0°) to its erected exposure position (37°).

During normal operation, drive spring 114 is operative to move reflecting member 56 from 0° to 37°, expending torque at a rate shown by line 154. Overtravel spring 134, due to the lack of relative movement between bell crank 96 and sleeve 122 during this operation, will not expend any torque as shown by line 156. At the exposure position (37°), drive spring 114 retains a loaded status as shown by point 158. The amount of torque which is retained by drive spring 114 at its terminal position of 37° is determined by the amount of its prewinding. It is this amount of torque which provides residual force for minimizing the elastic rebound of reflecting member 56 at its exposure position. After an exposure has been completed, motor 66 operates to rewind drive spring 114 an amount "y" to its cocked or loaded orientation. Overtravel spring 134 retains its prewound condition and no further tensioning from motor 66 is required. Spring 134 has been prewound an amount "x" for properly seating reflecting member 56 at its viewing position (0°).

For purposes of simplifying the description of override operation, interference of reflecting member 56 is assumed to occur at 37°. Motor 66 rewinds drive spring 114 the same amount "y" as it did during normal operation. However, overtravel spring 134 is wound an amount "z." This additional amount of torque is sufficient to drive bell crank 96 to its viewing mode orientation when the interference of reflecting member 56 has been removed. Upon removal of the interference, overtravel spring 134 releases this torque "z" into bell crank 96 and returns to its prewound status (0°).

The total tensioning ("y" and "z") of springs 114 and 134 should be minimized in order to keep motor 66 from overloading. This is accomplished by making the spring rates of springs 114 and 134 as low as possible; i.e., configuring both of them as multi-turn torsion springs. However, due to the thin and compact nature of camera 10, such multi-turn springs are not easily positioned within the internal structure of camera 10. In order to position two multi-turn springs in a limited area, overtravel spring 134 is placed within drive spring 114.

The coaxial positioning of springs 114 and 134 provides an additional advantage. Due to the positioning of drive spring 114 away from reflecting member 56, any possible warp to be realized from the direct linkage of a drive spring with an optical surface as at 62 will be minimized.

Since changes may be made in the above apparatus without departing from the scope of the invention herein involved, it is intended that all matter contained in the above description or shown in the accompanying drawings shall be interpreted as illustrative and not in a limiting sense.

What is claimed is:
1. Reflex photographic apparatus comprising:
   means defining an optical path having one configuration for viewing the image of a scene to be photographed, and another configuration for imaging said scene at an exposure plane;
   reflecting means movable between a viewing position and an exposure position for selectively converting said optical path from one said configuration to the other;
   a motor;
   erecting linkage means coupled with said reflecting means and actuable to move said reflecting means between said viewing and said exposure position;
   spring loaded drive means engageable with said erecting linkage means for actuating said erecting linkage means to move said reflecting means from said viewing position to said exposure position; and
   Overtravel spring means coupled with said erecting linkage means and drivable from said motor to actuate said erecting linkage means to move said reflecting means into said exposure position, said overtravel spring means being operative as a lost-motion connection with said motor when said reflecting means is restrained from movement.
2. Reflex photographic apparatus comprising:
   means defining an optical path having one configuration for viewing the image of a scene to be photographed and another configuration for imaging said scene at an exposure plane;
   reflecting means movable between a viewing position and an exposure position for selectively converting said optical path from one said configuration to the other;
   erecting linkage means coupled with said reflecting means and actuable to move said reflecting means between said viewing and said exposure positions;
   drive spring means for providing a rotational output of predetermined characteristic;
   actuator means drivably engageable with said linkage means and responsive to said drive spring means output for actuating said erecting linkage means to move said reflecting means from a select one of said positions to the other;
   motor means having an output connected in driving relationship with said actuator means for causing said actuating means to actuate said erecting linkage means to move said reflecting means into said one of said positions; and
   overtravel means coupled between said actuator means and said erecting linkage means and operative as a lost-motion connection with said motor means when said reflecting means is restrained.
3. The reflex photographic apparatus of claim 2 in which said drive spring means is a low-rate multi-turn torsion drive spring having a predetermined residual torque when said reflecting means is in said other position.
4. The reflex photographic apparatus of claim 2 in which said overtravel means is a low-rate multi-turn torsion spring positioned concentrically with said drive spring means.
5. The reflex photographic apparatus of claim 2 in which:
   said drive spring means is a multi-turn torsion drive spring having a predetermined residual torque when said reflecting means is in said other position;
   said actuator means includes sleeve means for drivably engaging said erecting linkage means; and
   said overtravel means is positioned coaxially with said sleeve means and said drive spring.
6. The reflex photographic apparatus of claim 5 in which said overtravel means is operative to effect said engagement between said sleeve means and said erecting linkage means.
7. The reflex photographic apparatus of claim 6 in which said overtravel means is present as a multi-turn torsion spring.

8. The reflex photographic apparatus of claim 6 in which said sleeve means is drivably engageable with said drive spring.

9. The reflex photographic apparatus of claim 8 in which said motor means is operative, when energized, to rotate said sleeve means so as to load said drive spring.

10. The reflex photographic apparatus of claim 9 in which said sleeve means is configured to rotate out of said engagement with said erecting linkage means when said reflecting means is restrained and said motor means is energized.

11. The reflex photographic apparatus of claim 6 in which said erecting linkage means is present as a four-bar linkage.

* * * * *

UNITED STATES PATENT OFFICE
CERTIFICATE OF CORRECTION

Patent No. 3,685,416          Dated August 22, 1972

Inventor(s) Edward H. Coughlin

It is certified that error appears in the above-identified patent and that said Letters Patent are hereby corrected as shown below:

Column 1, line 35 (Specification page 1, line 30) change "and" to --any--.

Column 1, line 66 (Specification page 2, line 28) change "an" to --a--.

Column 2, line 52 (Specification page 4, line 19) change "an" to --a--.

Column 2, line 67 (Specification page 5, line 3) change "an" to --a--.

Column 3, line 7 (Specification page 5, line 9) change "an" to --a--.

Column 4, line 27 (Specification page 8, line 4) change "an" to --a--.

Column 9, line 16 (Specification page 18, line 5) delete "Spring" and insert --Overtravel spring--.

Column 10, line 6 (Claim 1, line 19)
(Amendment - claim 1, line 20)
change "Overtravel" to --overtravel--.

Signed and sealed this 14th day of May 1974.

(SEAL)
Attest:

EDWARD M. FLETCHER, JR.
Attesting Officer

C. MARSHALL DANN
Commissioner of Patents